(No Model.)   2 Sheets—Sheet 1.

R. MULHOLLAND.
VEHICLE SPRING.

No. 289,438.   Patented Dec. 4, 1883.

Witnesses.
J. M. Caldwell
F. W. Brann

Inventor.
Richard Mulholland
By James Sangster
Atty.

(No Model.)

R. MULHOLLAND.
VEHICLE SPRING.

No. 289,438.

Patented Dec. 4, 1883.

Witnesses.
J. M. Caldwell.
F. W. Braun.

Inventor.
Richard Mulholland
By James Sangster
Atty

UNITED STATES PATENT OFFICE.

RICHARD MULHOLLAND, OF DUNKIRK, NEW YORK.

VEHICLE-SPRING.

SPECIFICATION forming part of Letters Patent No. 289,428, dated December 4, 1883.

Application filed May 31, 1883. (No model.)

*To all whom it may concern:*

Be it known that I, RICHARD MULHOLLAND, a citizen of the United States, residing in Dunkirk, in the county of Chautauqua and State of New York, have invented certain new and useful Improvements in Vehicle-Springs, of which the following is a specification.

My invention relates to certain improvements in vehicle-springs, which will be fully and clearly hereinafter shown by reference to the accompanying drawings, in which—

Figure 1:
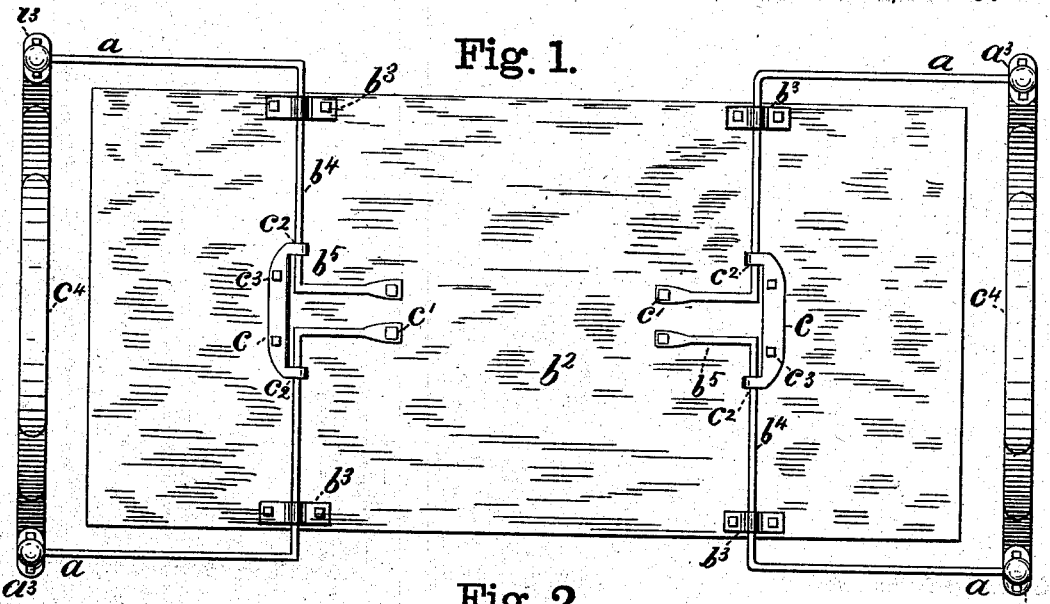
Figure 2:
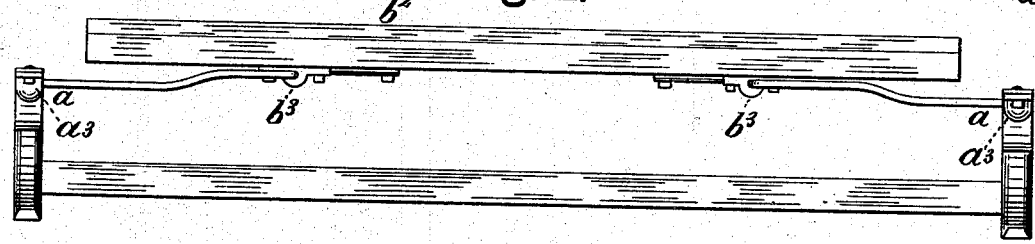
Figure 3:
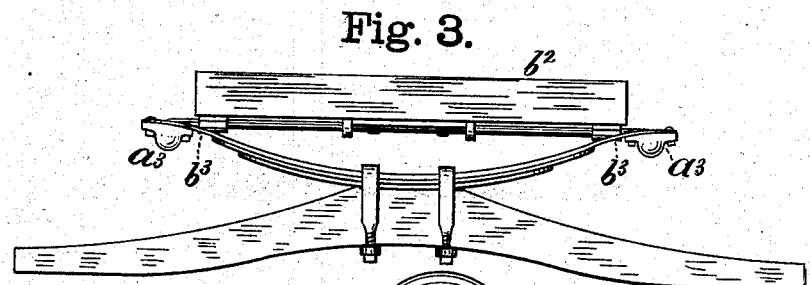
Figure 4:
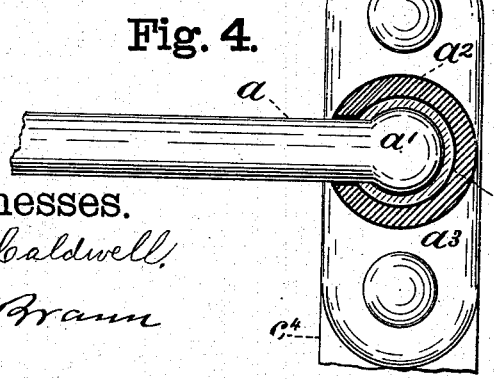
Figure 5:
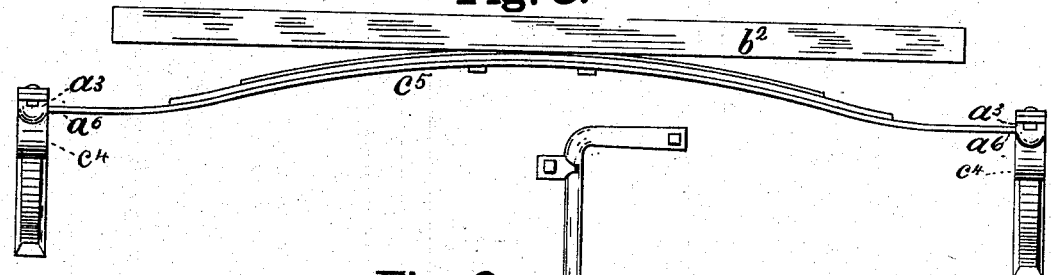
Figure 6:
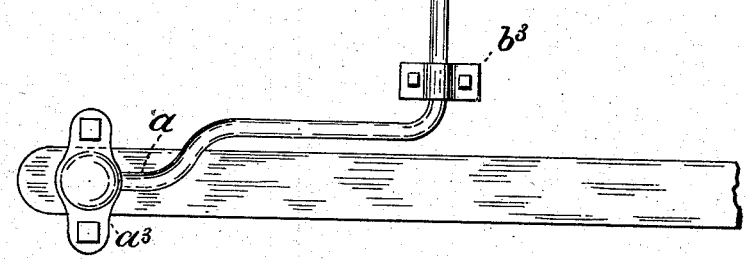
Figure 7:
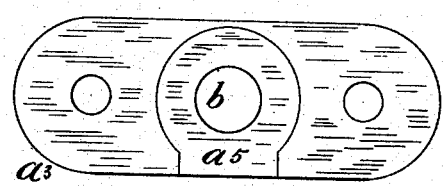

Figure 1 is a bottom view of a vehicle, showing a suitable construction of springs having my invention connected thereto. Fig. 2 is a side elevation of the same. Fig. 3 is an end view. Fig. 4 shows an enlarged bottom view of the end of a spring and coupling for connecting it, a portion being in section. Fig. 5 is a side elevation, showing leaf side springs combined with leaf cross-springs, each having my improvement at the ends. Fig. 6 is a detached bottom view of a torsion-spring and a portion of a cross-spring, showing a portion of the torsion-spring arranged parallel, or nearly so, with the cross-spring, the ends of each being provided with my improvement. Fig. 7 is a top view of the ball-and-socket coupling, and Fig. 8 is a side elevation of the same.

The object of my invention is to dispense with the use of the ordinary spring shackles and bolts for connecting the ends of the springs and to improve the appearance of the same.

In Fig. 4, $a$ represents the end of a torsion-spring similar to the springs shown in Fig. 1. At the end of the spring is a ball, $a'$, adapted to fit in a socket, $a^2$, which forms a part of the coupling $a^3$. It may be necessary to use a bushing of Babbitt metal, leather, or other suitable material, $a^4$.

Figure 8:
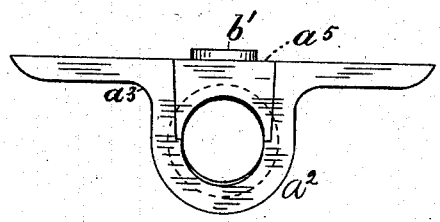

In Figs. 7 and 8, $a^5$ represents a removable cap to admit of the attachment or detachment of the ball end of the spring. In attaching the end of the spring, this cap is removed and the ball end of the spring is put in place. The cap is then put on and secured to the coupling, thereby holding the spring in position. If necessary, an opening, $b$, (see Fig. 7,) may be made through the cap $a^5$ and a piece of rubber, $b'$, (shown in Fig. 8,) inserted, which is secured in place by the under part of the spring or other part to which the coupling is attached.

The object of the rubber is to take up lost motion and prevent rattling.

Figs. 1, 2, and 3 represent a suitable arrangement of springs for carrying out my invention; but any other form or arrangement of springs may be provided with a ball-and-socket coupling, and used in lieu thereof, as my invention is adapted not only for a torsion-spring, but for a leaf or any other kind of a spring or its connections.

In Figs. 1, 2, 3, and 5, $b^2$ represents the bottom of the body or bed of a vehicle. The torsion-springs $a$ are formed so that the inner portions, $b^4$, are connected thereto by journal-boxes $b^3$ on each side, secured by bolts in the ordinary way, and the parts $b^4$ are rigidly secured by the spring-fastening $c$, and at the ends $b^5$ by bolts $c'$. The spring-fastening $c$ is provided with hooks or lugs $c^2$ and bolt or bolts $c^3$, for securing it to the bottom of the vehicle and the spring in place.

$c^4$ represents the semi-elliptical cross-springs. They are attached to the front and rear of the vehicle in any well-known way; but such springs may be dispensed with and the couplings attached directly to spring-bars or to the axle; or side leaf-springs, $c^5$, provided with ball-and-socket couplings, may be used instead of the torsion-springs, as shown in Fig. 5. The ball $a'$ may be attached to or form a part of either the side or cross springs, the other spring or bar being provided with the ball-coupling to receive it. The position of the coupling may be either in a line with the length of the spring or bar to which it is attached, or it may be put on crosswise of the same, as shown in Fig. 6, and the arms of the torsion or other spring may run parallel with the spring or bar, substantially as shown in said Fig. 6. The coupling may form a part or be attached to the top end of the spring or bar, instead of the under side of the same, if preferred. These couplings $c^5$ may be of any external shape, having an inward ball-cavity adapted to receive and hold the ball-connection.

I am aware that a ball-and-socket joint has been a common means to connect the springs of vehicles. I therefore do not claim such, broadly; but What I do claim is—

1. A vehicle-spring having at its end, of the same continuous piece, or rigidly fastened thereto, a ball adapted to work in a ball-socket, said socket forming a part of another spring or support, as described, so that the ball end of the one operates directly in the other, the socket having a removable cap, to admit of the ready attachment and detachment of the spring, substantially as shown and specified.

2. A vehicle-spring provided with a ball at its end, in combination with a coupling having a suitable bushing within the socket and surrounding the ball, substantially as specified, and a removable cap, as and for the purposes described.

3. A vehicle-spring coupling consisting of the parts $a^2$ $a^3$, a removable cap, $a^5$, and a bushing arranged within the socket and surrounding the ball, substantially as and for the purposes specified.

4. In a vehicle-spring coupling, the combination of a spring provided with a ball, $a'$, a socketed portion, $a^2$, and a cap, $a^5$, having an opening, $b$, through which passes a rubber spring, which presses against the head of the spring, as and for the purposes specified.

RICHARD MULHOLLAND.

Witnesses:
J. M. CALDWELL,
JAMES SANGSTER.